Patented Feb. 25, 1930

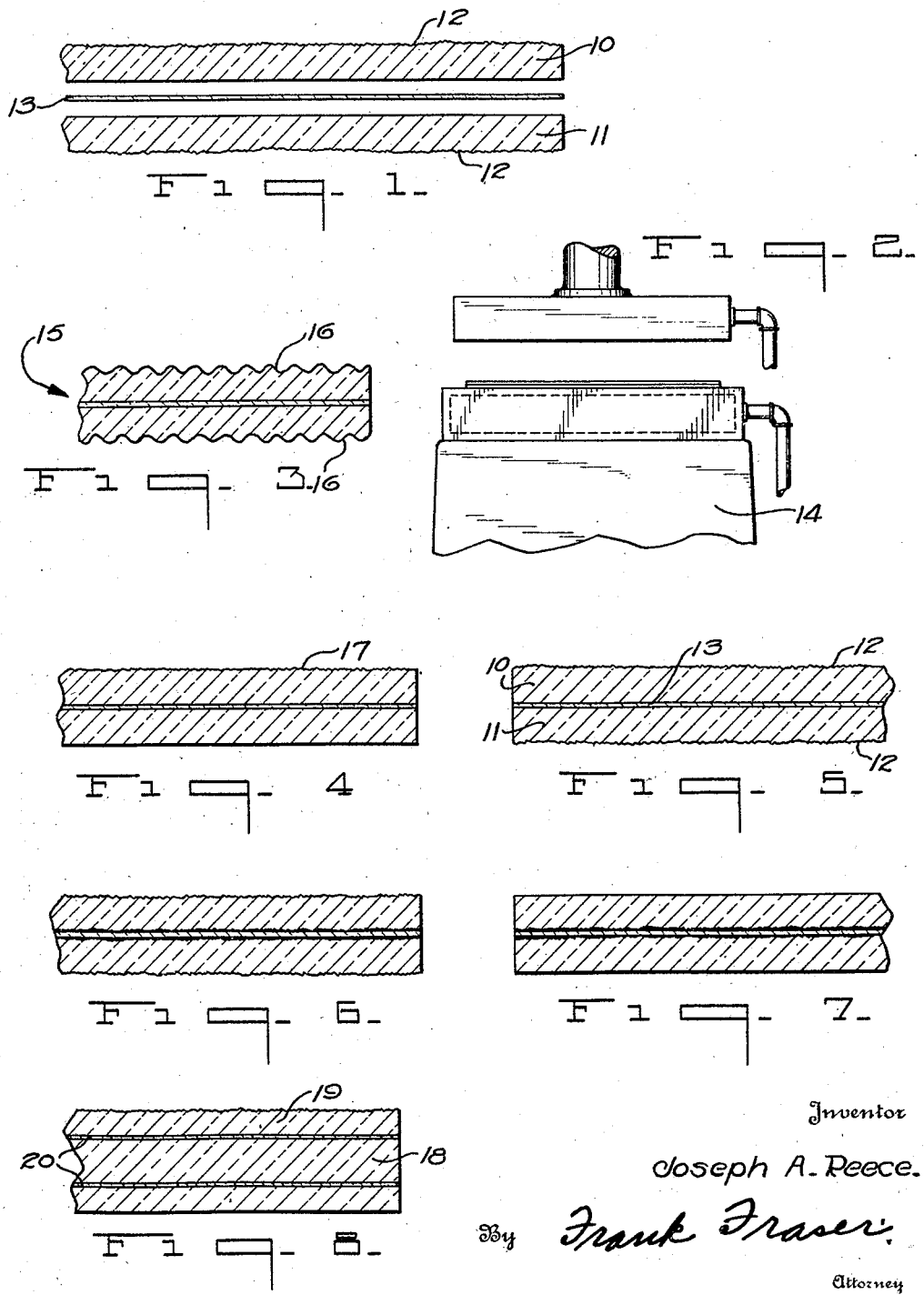

1,748,080

UNITED STATES PATENT OFFICE

JOSEPH A. REECE, OF TOLEDO, OHIO, ASSIGNOR TO LIBBEY-OWENS GLASS COMPANY, OF TOLEDO, OHIO, A CORPORATION OF OHIO

TRANSLUCENT LAMINATED GLASS AND PROCESS FOR MAKING SAME

Application filed April 30, 1926. Serial No. 105,674.

The present invention relates to laminated glass, and to the process of producing the same.

An important object of the invention is to provide a method for producing laminated glass which is not transparent.

Another object of the invention is to provide a process for producing laminated glass, wherein a plurality of sheets of glass and a sheet or plurality of sheets of non-brittle material are united, at least one surface of one of the sheets of glass being relatively rough to produce a finished sheet of laminated glass which is relatively translucent.

Other objects and advantages of the invention will become apparent during the course of the following description.

In the drawings wherein like numerals are employed to designate like parts throughout the same, Fig. 1 is a sectional view illustrating the laminations before they are united, Fig. 2 is a diagrammatic view of the form of press which may be used to unite the laminations, and Figs. 3 to 8, inclusive, are sectional views of various modified forms.

In accordance with the present invention, a sheet of laminated glass is produced by uniting a plurality of sheets of glass and one or more sheets of non-brittle material, at least one surface of one of the sheets of glass being comparatively rough to produce a finished sheet which is substantially translucent.

In Fig. 1 is illustrated a sheet of laminated glass prior to the uniting of the various laminations. In this figure, two sheets of glass 10 and 11, having outer roughened surfaces have interposed therebetween a sheet of non-brittle material 13. To unite the three laminations they are sandwiched together and placed in a suitable press, designated diagrammatically in Fig. 2, and indicated by the numeral 14. Any form of suitable binder or the like may be used to create a good union between the three laminations. The finished product will, due to the outer surfaces 12, be translucent.

In Fig. 3, the finished sheet of laminated glass 15 is made up of two sheets of prismatic glass. In this particular form the outer surfaces 16 of the two sheets are prismatic, while the inner surfaces are smooth.

In Fig. 4 one outer surface only 17 is roughened, while the remaining surfaces of the sheets of glass are smooth. The remaining figures illustrate other combinations of smooth and roughened surfaces which may be resorted to. In Fig. 8 is shown in section a sheet of so-called bullet-proof glass, which ordinarily comprises a central sheet 18 of relatively thick glass and two outer sheets of glass 19 which are relatively thin. The three sheets have interposed therebetween sheets of non-brittle material 20.

The roughened surfaces referred to may be ground surfaces, sand blasted surfaces, corrugated surfaces, prismatic surfaces, etc.

A sheet of translucent glass, formed in accordance with the present invention, will withstand considerable shock before breaking, and even if the glass sheets break the fragments will be held by the non-brittle sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. As a new article of manufacture, a sheet of laminated glass comprising a plurality of laminations bonded together, the outer surface of at least one of said outer laminations being relatively rough and the inner surface of the respective lamination being smooth.

2. As a new article of manufacture, a sheet of laminated glass comprising two sheets of glass and a sheet of non-brittle material bonded together, the surfaces of the glass sheets arranged inwardly of the laminated sheet being relatively smooth, and the outer surface of at least one of the glass sheets being relatively rough.

3. A sheet of translucent laminated glass comprising two sheets of glass and a sheet of non-brittle material bonded together, the surfaces of the glass sheets joined to the non-brittle sheet being smooth, while the outer surfaces of the glass sheets are relatively rough.

4. The process of producing laminated glass, consisting in creating a relatively roughened surface on a sheet of glass, and then uniting the sheet of glass to a sheet of non-brittle material in a manner that the roughened surface becomes an outside surface of the finished sheet while the inner surface of the glass sheet is smooth.

5. The process of producing laminated glass, consisting in creating a relatively roughened surface on one side only of two sheets of glass, arranging the glass sheets at opposite sides of a sheet of non-brittle material in a manner that the roughened surfaces are positioned outwardly and the smooth surfaces inwardly, and in then uniting the glass sheets to the sheet of non-brittle material to form a composite structure.

Signed at Toledo, in the county of Lucas, and State of Ohio, this 28th day of April, 1926.

JOSEPH A. REECE.